(12) United States Patent
Hansen et al.

(10) Patent No.: US 7,891,260 B2
(45) Date of Patent: Feb. 22, 2011

(54) SEAT SENSOR APPARATUS FOR OCCUPANT PRESENCE DETECTION

(75) Inventors: Mark C. Hansen, Kokomo, IN (US); Morgan D. Murphy, Kokomo, IN (US); Thomas Fischer, Wenden (DE); Bo Lu, Westfield, IN (US); Duane D. Fortune, Lebanon, IN (US); Sandeep D. Punater, Dayton, OH (US); Kendall B. Gerhardt, Noblesville, IN (US); Kevin J. Hawes, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 198 days.

(21) Appl. No.: 12/366,146

(22) Filed: Feb. 5, 2009

(65) Prior Publication Data

US 2010/0192698 A1   Aug. 5, 2010

(51) Int. Cl.
    *G01L 1/26* (2006.01)
(52) U.S. Cl. .................................... 73/862.391; 73/760
(58) Field of Classification Search .................. 73/760, 73/862.381–862.391
    See application file for complete search history.

(56) References Cited

U.S. PATENT DOCUMENTS

| 6,359,245 | B1 | | 3/2002 | Wahls |
| 6,499,359 | B1 | * | 12/2002 | Washeleski et al. .... 73/862.473 |
| 6,886,417 | B2 | * | 5/2005 | Murphy et al. ......... 73/862.581 |
| 7,106,206 | B2 | * | 9/2006 | Sprecher et al. ............. 340/667 |
| 7,472,602 | B1 | * | 1/2009 | Feng et al. ..................... 73/789 |
| 7,523,679 | B2 | * | 4/2009 | Hawes et al. ........... 73/862.381 |
| 7,703,333 | B2 | * | 4/2010 | Hayakawa et al. ............ 73/849 |
| 2004/0256842 | A1 | * | 12/2004 | Breed ...................... 280/730.1 |
| 2006/0196281 | A1 | | 9/2006 | Koors |
| 2008/0203712 | A1 | | 8/2008 | Hawes et al. |

* cited by examiner

*Primary Examiner*—Max Noori
(74) *Attorney, Agent, or Firm*—Thomas N. Twomey

(57) ABSTRACT

An occupant presence sensor apparatus disposed in a seat includes first and second substantially non-compliant force translation plates generally parallel to the seating surface of the seat, an elastomeric mat disposed between the first and second force translation plates, and a switch mechanism disposed between the first and second force translation plates within an opening formed in the elastomeric mat. The elastomeric mat includes a distributed array of hollow protuberances that extend toward and contact the force translation plates, and the mat has a stiffness that normally provides a clearance between the switch mechanism and one of the force translation plates. When an occupant of specified or higher weight sits on the seating surface, the protuberances collapse and the force translation plates activate the switch mechanism.

7 Claims, 2 Drawing Sheets

SEAT SENSOR APPARATUS FOR OCCUPANT PRESENCE DETECTION

TECHNICAL FIELD

The present invention is directed to a sensor apparatus disposed in a vehicle seat for detecting the presence of a seat occupant.

BACKGROUND OF THE INVENTION

Motor vehicles are customarily equipped with seat occupant detection sensors for use in connection with occupant safety systems including seat belts and pyrotechnically deployed restraints such as air bags. For example, an occupant detection sensor can be used in connection with a seat belt switch to detect an unrestrained seat occupant and trigger an appropriate reminder. Additionally, occupant detection sensors can be used to enable or disable air bag deployment for a particular seating location in the vehicle, and potentially to classify the occupant by seated weight.

A common approach to seat occupant detection involves installing one or more pressure-responsive sensors on, in, or under the bottom foam cushion of the seat. In some cases, the pressure is measured and compared to one or more calibrated thresholds, as shown for example, in the published patent application US 2006/0196281 A1. In other cases, a calibrated occupant seat pressure is detected by closure of one or more switches, as shown for example, in the published patent application US 2008/0203712 A1.

SUMMARY OF THE INVENTION

The present invention is directed to an improved occupant presence sensor apparatus that can be manufactured at low cost, and that can be cost-effectively adapted for use with seats of diverse geometry, materials and degree of firmness. The sensor apparatus includes first and second substantially non-compliant force translation plates disposed in a seat in an orientation that is generally parallel to the seating surface of the seat, an elastomeric mat disposed between the first and second force translation plates, and a switch mechanism disposed in an opening in the elastomeric mat. The elastomeric mat includes at least one distributed array of hollow protuberances that extend toward and contact one of the first and second force translation plates, and the mat has a stiffness that allows the hollow protuberances to collapse and activate the switch mechanism when an occupant having a specified or higher weight sits on the seating surface. In a preferred embodiment, the switch mechanism is affixed to the first force translation plate, and has a depressible element that extends toward the second force translation plate. The hollow protuberances of the elastomeric mat produce a clearance between the depressible element and the second force translation plate when not collapsed, but collapse to allow the second force translation plate to contact and displace the depressible element when an occupant of the specified or higher weight sits on the seating surface. The sensor is adapted for use with seats having diverse geometry, materials and firmness simply by using an elastomeric mat exhibiting a suitable degree of stiffness.

DESCRIPTION OF THE PREFERRED EMBODIMENT

The sensor apparatus of the present invention is disclosed herein in the context of a seat sensor for sensing the presence of a seat occupant when sufficient force due to the occupant's seated weight is transmitted to the sensor apparatus. However, it should be understood that the disclosed sensor apparatus may be used in other applications, both vehicular and non-vehicular.

Figure 1:
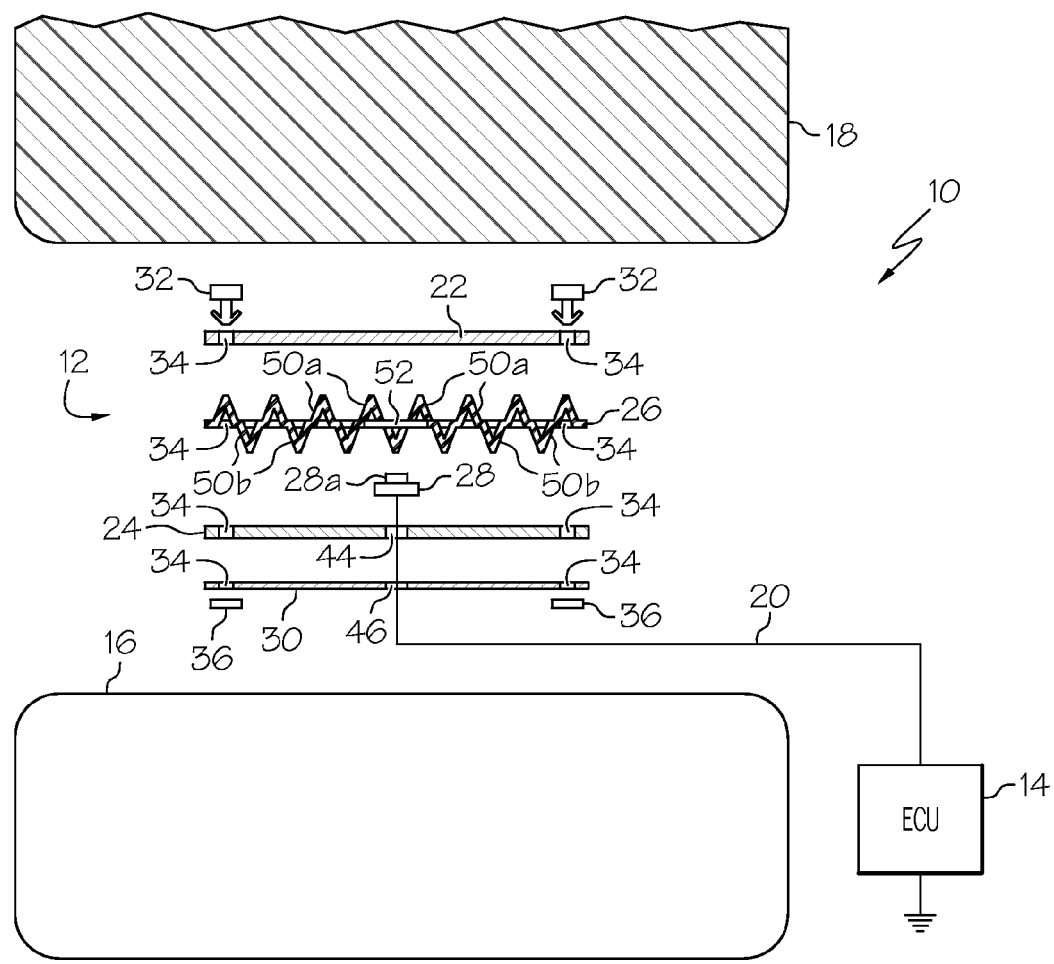
FIG. 1 is an exploded cross-sectional view of a seat equipped with a seat sensor according to the present invention.

Referring to FIG. 1, the reference numeral 10 generally designates a vehicle seat equipped with a seat sensor 12 according to the present invention. In the illustrated embodiment, the seat sensor 12 is disposed between the seat suspension 16 and a foam seat cushion 18, though it should be understood that the seat sensor 12 may be installed in a different location such as in the seat cushion 18. In any event, the seat sensor 12 is coupled to an electronic control unit (ECU) 14 by one or more wires 20. The ECU 14 analyzes the state of sensor 12 to determine whether the seat 10 is occupied, and activates a seat belt reminder indicator (not shown) if a seat belt for seat 10 is not fastened. Of course, the ECU 14 may also perform other safety-related functions such as enabling or disabling airbag deployment.

As illustrated in FIG. 1, the seat sensor 12 includes the following components: upper and lower substantially non-compliant force translation plates 22 and 24, an elastomeric mat 26 and a switch mechanism 28 disposed between the force translation plates 22 and 24, and a felt pad 30 disposed beneath the lower force translation plate 24. Occupant sensing is accomplished by the components 22-28, while the felt pad 30 provides an interface between the lower force translation plate and the seat suspension 16. The aforementioned components of sensor 12 are joined as shown with two or more push-pins 32 that extend through aligned openings 34 formed in the force translation plates 22 and 24, the elastomeric mat 26, and the felt pad 30. The push-pins 32 are received in plastic washers 36 positioned on the opposite side of the sensor 12. By way of example, the components joined by push-pins 32 may be square in shape, with lateral dimensions of approximately 75 mm (3 in). Also, another set of push-pins (not shown) may be used to affix the seat sensor 12 to the seat suspension 16, if desired.

Figures 2, 3:
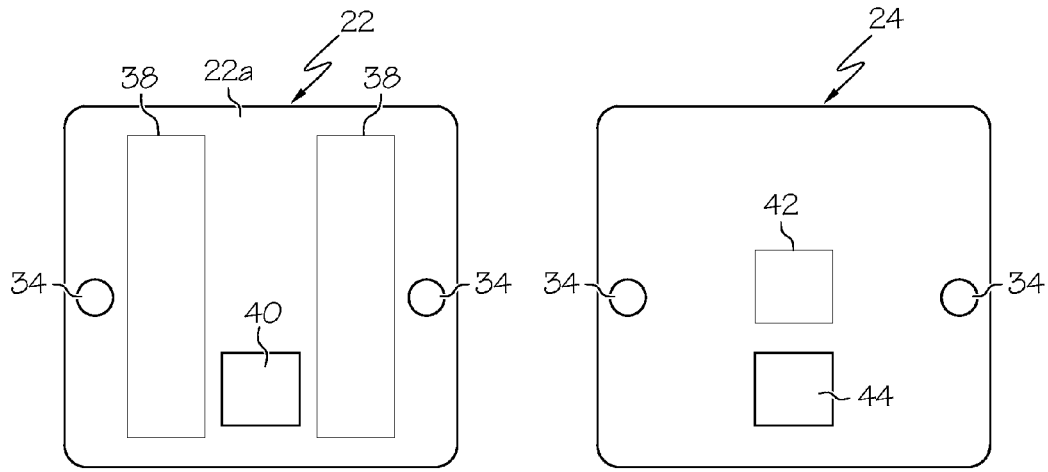
FIG. 2 depicts the outboard face of a first (upper) force translation plate of the seat sensor of FIG. 1.
FIG. 3 depicts an inboard face of a second (lower) force translation plate of the seat sensor of FIG. 1.

The upper and lower force translation plates 22 and 24 are preferably made of substantially non-compliant plastic material so that compressive forces applied to the sensor 12 due to seat occupant weight are nearly uniformly applied to the elastomeric mat 26. As illustrated in FIG. 2, the outboard face 22a of upper force translation plate 22 may be provided with strips of double-backed tape 38 to secure the sensor 12 to the lower surface of the seat cushion 18. As also illustrated in FIG. 2, the upper force translation plate 22 may be provided with an opening 40 to permit visual inspection of the underlying elastomeric mat 26; visual inspection of the mat 26 is important when mats of diverse stiffness for different seat applications are color-coded by stiffness.

The switch mechanism 28 is glued, mechanically fastened, or otherwise affixed to a central location on the inboard face 24a of lower force translation plate 24, as indicated by the reference numeral 42 in FIG. 3. The wires 20 from switch mechanism 28 pass through aligned openings 44 and 46 formed in the lower force translation plate 24 and felt pad 30, as illustrated in FIGS. 1, 3 and 4.

Figures 4, 5:
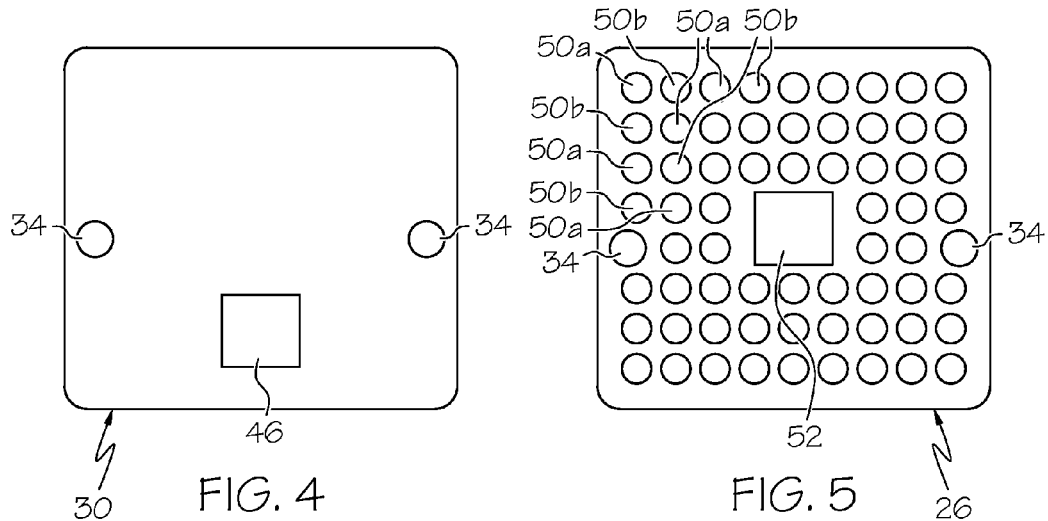
FIG. 4 depicts an inboard face of a felt pad of the seat sensor of FIG. 1.
FIG. 5 depicts an elastomeric mat of the seat sensor of FIG. 1.
Figure 6:
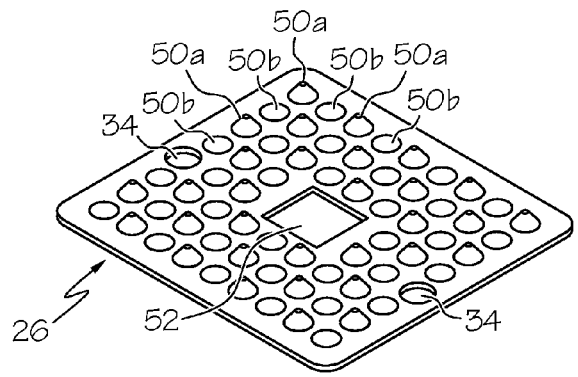
FIG. 6 is an isometric view of the elastomeric mat of FIG. 5.

The elastomeric mat 26 is preferably made of a material such as silicone, and as illustrated in FIGS. 1 and 5, is formed with a distributed array of hollow cone-shaped protruberances 50 that alternately extend toward the upper and lower force translation plates 22 and 24. The protruberances that extend upward toward the upper force translation plate 22 are identified in FIG. 1 by the reference numeral 50a, while the protruberances that extend downward toward the lower force translation plate 24 are identified by the reference numeral 50b. And as illustrated in FIGS. 1 and 5, a central opening 52 is formed in mat 26 to accommodate the switch mechanism 28.

When the sensor 10 is assembled as described above, the tips of the silicone mat protruberances 50a and 50b respectively contact the upper and lower force translation plates 22 and 24 to separate the upper and lower force translation plates 22, 24 by a distance (8 mm, for example) sufficient to accommodate the height of switch mechanism 28. In other words, with switch mechanism 28 affixed to the inboard face of the lower force translation plate 24, and disposed within the opening 52 of mat 26, there is a slight clearance between the switch mechanism 28 and the upper force translation plate 22. This is the condition that occurs when the seat 10 is unoccupied. However, when the sufficient occupant weight is applied to the seating surface of cushion 18, the hollow protuberances 50a, 50b collapse, allowing the upper force translation plate 22 to contact and actuate the switch mechanism 28. The same effect can be achieved with an elastomeric mat formed with an array of hollow protuberances that only extend toward one of the force translation plates 22, 24, but the illustrated configuration is generally preferable because its orientation can be reversed without affecting the operation of the sensor 12, and because the likelihood of air-lock suction between the mat 26 and the inboard face of a force translation plate 22 or 24 is virtually eliminated.

In a preferred implementation, the switch mechanism 28 is provided with a depressible element 28a that extends upward toward the upper force translation plate 22. For example, the depressible element 28a may be the plunger (armature) of a sealed switch element; in this case, the upper force translation plate 22 contacts and linearly displaces the plunger as the hollow protuberances 50a, 50b of elastomeric mat 26 collapse when an occupant sits on the cushion 18. Alternately, the switch mechanism 28 may be configured as an elastomeric or metal dome switch, where the depressible element 28a is the dome; in this case, the dome switch may be mounted on a small circuit board that is affixed to the inboard face of the lower force translation plate 24, and optionally, the inboard face of the upper force translation plate 22 may be provided with a downwardly extending dimple that contacts and deflects the dome to actuate the switch mechanism 28 when the hollow protuberances 50a, 50b of elastomeric mat 26 collapse. As a further alternative, the switch mechanism 28 may be configured as a magnetically-activated switch such as a sealed reed switch or a Hall-Effect switch; in this case, a magnet is affixed to the upper force translation plate 22 so that the switching mechanism 28 is activated (indicating occupant presence) when the hollow protuberances 50a, 50b of elastomeric mat 26 collapse to bring the magnet sufficiently close to the switching mechanism 28.

It will be appreciated that the subject seat sensor 12 can be manufactured at a relatively low cost because the components themselves are simple and inexpensive. And this cost effectiveness is enhanced due to the fact that the sensor 12 can be configured to provide a reliable occupant presence indication for seats having different constructions and/or materials, and seats having different firmness due to differences in the stiffness of foam cushion 18 or the springiness of seat suspension 16, simply through proper selection of the elastomeric mat 26. For example, a seat that is very firm will generally require a sensor having an elastomeric mat 26 exhibiting a high degree of stiffness, and a seat that is less firm will require a sensor having an elastomeric mat 26 exhibiting a lower degree of stiffness. But in any event, the other components of the seat sensor 12 remain the same. And the various elastomeric mats are preferably color-coded by stiffness to ensure that the sensors are correctly assembled, and to enable correct identification of an assembled sensor 12 by visual inspection (for example, by viewing the mat 26 through the opening 40 provided in upper force translation plate 22).

In summary, the present invention provides a practical and cost-effective sensor apparatus for passenger presence detection. While the apparatus has been described in reference to the illustrated embodiment, it should be understood that various modifications in addition to those mentioned above will occur to persons skilled in the art. Accordingly, it is intended that the invention not be limited to the disclosed embodiment, but that it have the full scope permitted by the language of the following claims.

The invention claimed is:

1. Sensor apparatus for detecting presence or absence of an occupant on a seating surface of a seat, comprising:
   first and second substantially non-compliant force translation plates disposed in said seat in an orientation that is generally parallel to said seating surface;
   an elastomeric mat disposed between said first and second force translation plates, said elastomeric mat including at least one distributed array of protuberances that extend toward and contact one of said first and second force translation plates, where said protuberances collapse due to occupant weight when the occupant sits on the seating surface;
   an opening in a central portion of said elastomeric mat; and
   a switch mechanism disposed in the opening of said elastomeric mat, and affixed to one of said first and second force translation plates, said switch mechanism having a first state indicating absence of the occupant when the protuberances of said elastomeric mat are not collapsed, and a second state indicating presence of the occupant when the protuberances of said elastomeric mat are collapsed.

2. The sensor apparatus of claim 1, where:
   said elastomeric mat includes a first distributed array of protuberances that extend toward and contact said first force translation plate, and a second distributed array of hollow protuberances that extend toward and contact said second force translation plate.

3. The sensor apparatus of claim 2, where:
   the protuberances of said first and second distributed arrays of protuberances are hollow.

4. The sensor apparatus of claim 1, where:
   said switch mechanism is affixed to the second force translation plate, and includes a depressible element extending toward said first force translation plate; and the protuberances of said elastomeric mat produce a clearance between the depressible element and the first force translation plate when said protuberances are not collapsed.

5. The sensor apparatus of claim 4, where:

said elastomeric mat is formed of a material that is manufactured to exhibit a desired stiffness so that for any given seat, the protuberances of said elastomeric mat produce a clearance between the first force translation plate and the depressible element of the switch mechanism when said protuberances are not collapsed, and an occupant weight of a specified or higher amount on the seating area causes the protuberances to collapse so that the first force translation plate displaces said depressible element to activate the second state of said switch mechanism.

6. The sensor apparatus of claim 5, where:

elastomeric mats of exhibiting different stiffnesses are color-coded based on stiffness to allow visual confirmation that a mat of the correct stiffness is installed in a given sensor.

7. The sensor apparatus of claim 1, where said switch mechanism comprises:

a magnetically activated sensor element affixed to the second force translation plate; and a magnet affixed to the first force translation plate.

\* \* \* \* \*